United States Patent
Liao et al.

(10) Patent No.: US 8,254,096 B2
(45) Date of Patent: Aug. 28, 2012

(54) ALL-IN-ONE COMPUTER

(75) Inventors: Yi-Lan Liao, Taipei Hsien (TW);
Tsung-Hsi Li, Taipei Hsien (TW);
Shu-Yun Huang, Taipei Hsien (TW)

(73) Assignee: Hon Hai Precision Industry Co., Ltd.,
Tu-Cheng, New Taipei (TW)

( * ) Notice: Subject to any disclaimer, the term of this patent is extended or adjusted under 35 U.S.C. 154(b) by 314 days.

(21) Appl. No.: 12/646,882

(22) Filed: Dec. 23, 2009

(65) Prior Publication Data

US 2011/0026216 A1 Feb. 3, 2011

(30) Foreign Application Priority Data

Jul. 29, 2009 (CN) .......................... 2009 1 0304955

(51) Int. Cl.
*H05K 5/03* (2006.01)

(52) U.S. Cl. ............ 361/679.02; 361/679.33; 312/223.1

(58) Field of Classification Search ............ 361/679.01, 361/679.02, 679.33–679.39; 349/58–60; 345/173; 312/223.1–223.2
See application file for complete search history.

(56) References Cited

U.S. PATENT DOCUMENTS

| 7,800,891 B2 * | 9/2010 | Shi et al. ................... 361/679.01 |
| 2005/0168935 A1 * | 8/2005 | Inoue et al. .................... 361/685 |
| 2011/0019358 A1 * | 1/2011 | Liao et al. ................ 361/679.46 |
| 2011/0026211 A1 * | 2/2011 | Liao et al. ................ 361/679.21 |

* cited by examiner

*Primary Examiner* — Jinhee Lee
*Assistant Examiner* — Ingrid Wright
(74) *Attorney, Agent, or Firm* — Altis Law Group, Inc.

(57) ABSTRACT

An all-in-one computer includes a hard disk drive (HDD), a main body, a cover, and a fasten member. The main body defines a receiving space to receive the HDD, and a fasten hole. The receiving space is bounded by a number of walls. A first raised edge protrudes from the number of walls in the receiving space. The cover includes a board, a first hook, and a mounting piece defining a through hole. The board includes opposite first and second ends. The first hook extends from the first end. The mounting piece extends from the second end. When the cover is mounted to the main body, the first hook snappingly hooks an inner side of the first raised edge, the board is stopped by the first raised edge, and the fasten member can extend through the through hole and engage in the fasten hole.

20 Claims, 5 Drawing Sheets

ALL-IN-ONE COMPUTER

BACKGROUND

1. Technical Field

The present disclosure relates to all-in-one computers, and more particularly to an all-in-one computer with conveniently replaceable hard disk drive (HDD).

2. Description of Related Art

In the market, some all-in-one computers need to be completely disassembled in order to replace an HDD when needed, and in others, several screws need to be removed from an access panel for replacing an HDD, which is also inconvenient.

DETAILED DESCRIPTION

Figure 1:
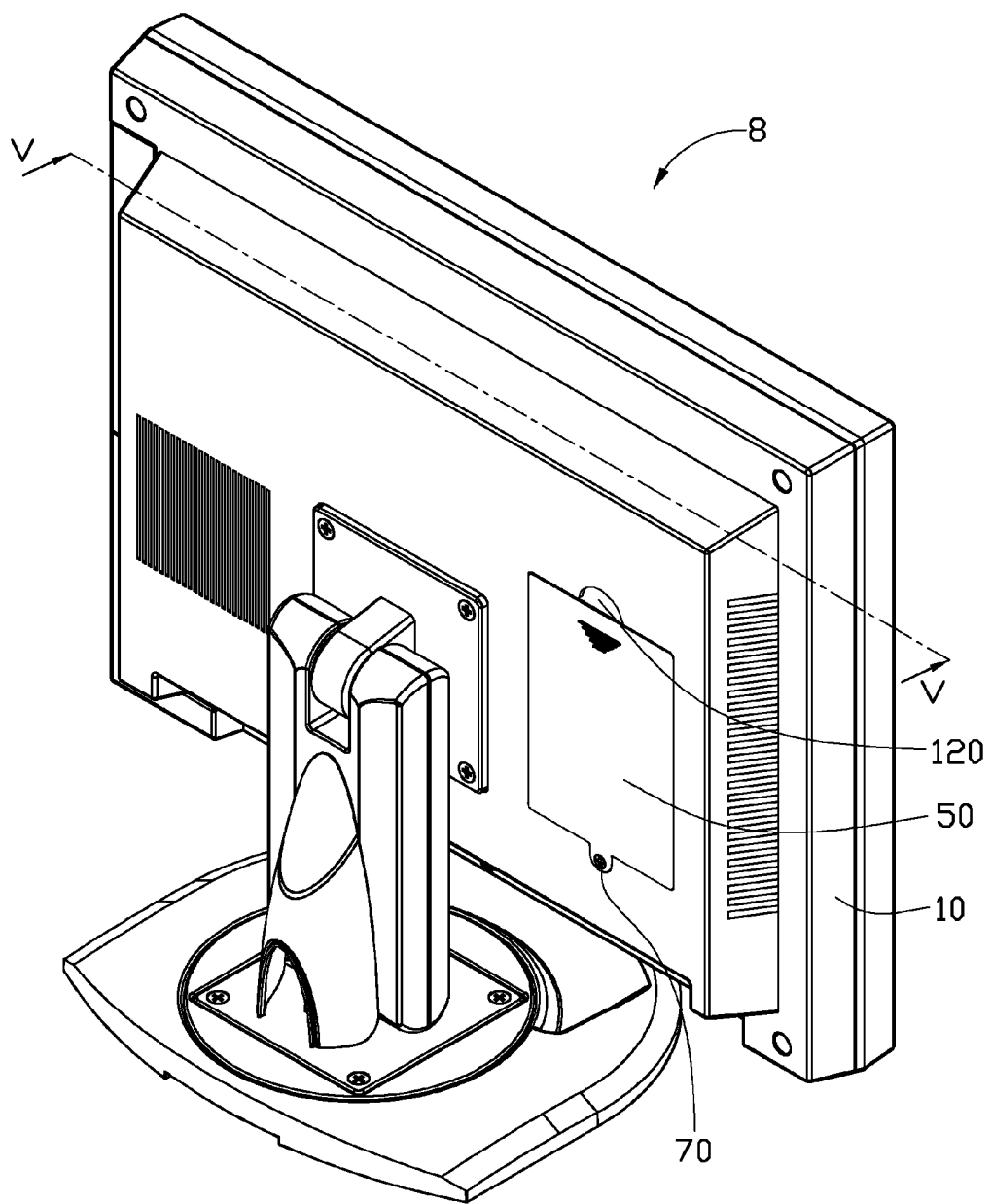
FIG. 1 is an isometric view of an embodiment of an all-in-one computer.
Figure 2:
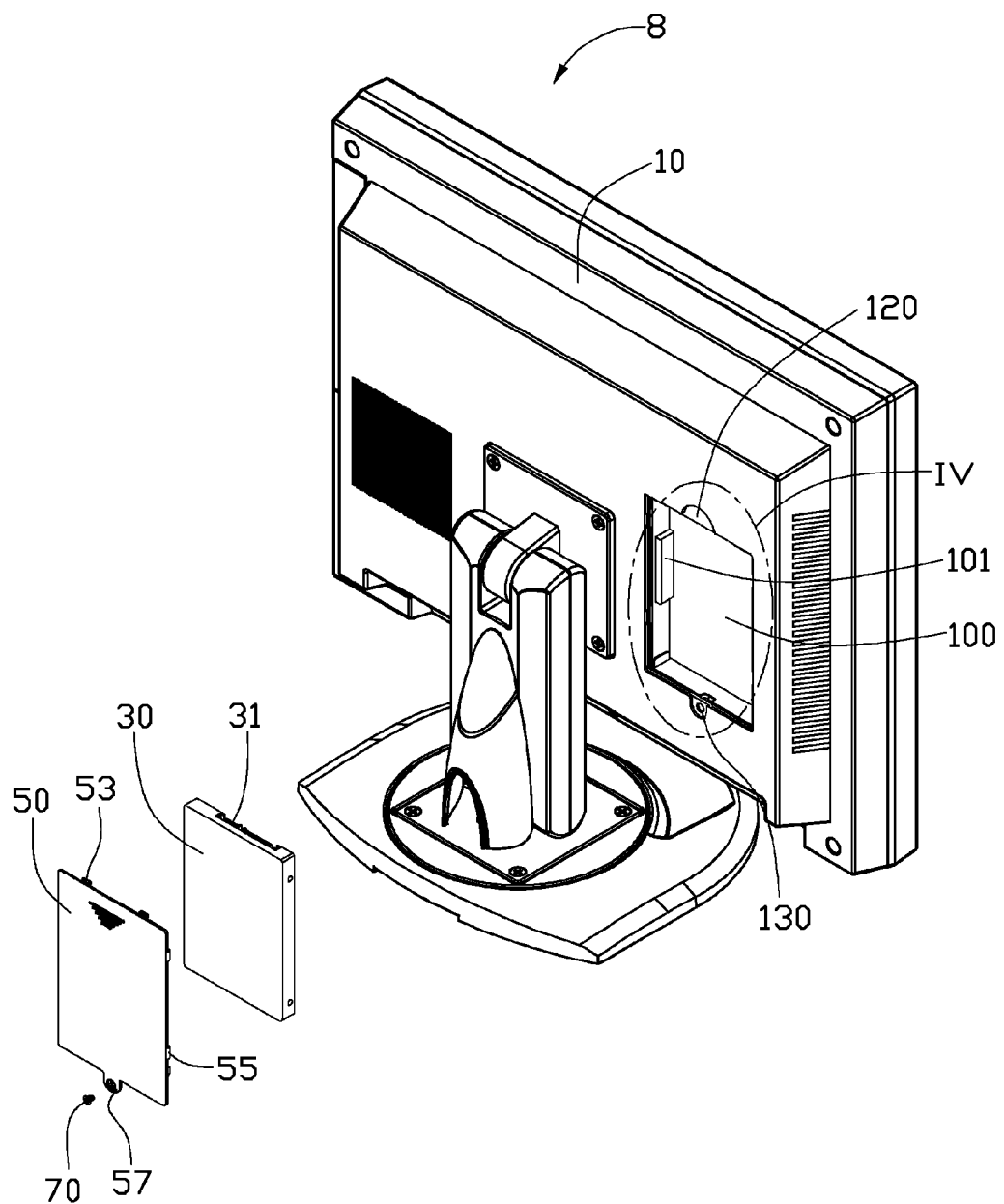
FIG. 2 is an exploded, isometric view of the all-in-one computer in FIG. 1, the all-in-one computer including a cover.

Referring to FIGS. 1 and 2, an embodiment of an all-in-one computer 8 includes a main body 10, a hard disk drive (HDD) 30, a cover 50, and a fasten member 70.

The HDD 30 is rectangular. A male connector 31 extends from an end of the HDD 30.

The fasten member 70 may be a screw, a pin or other fasten means.

Figure 3:
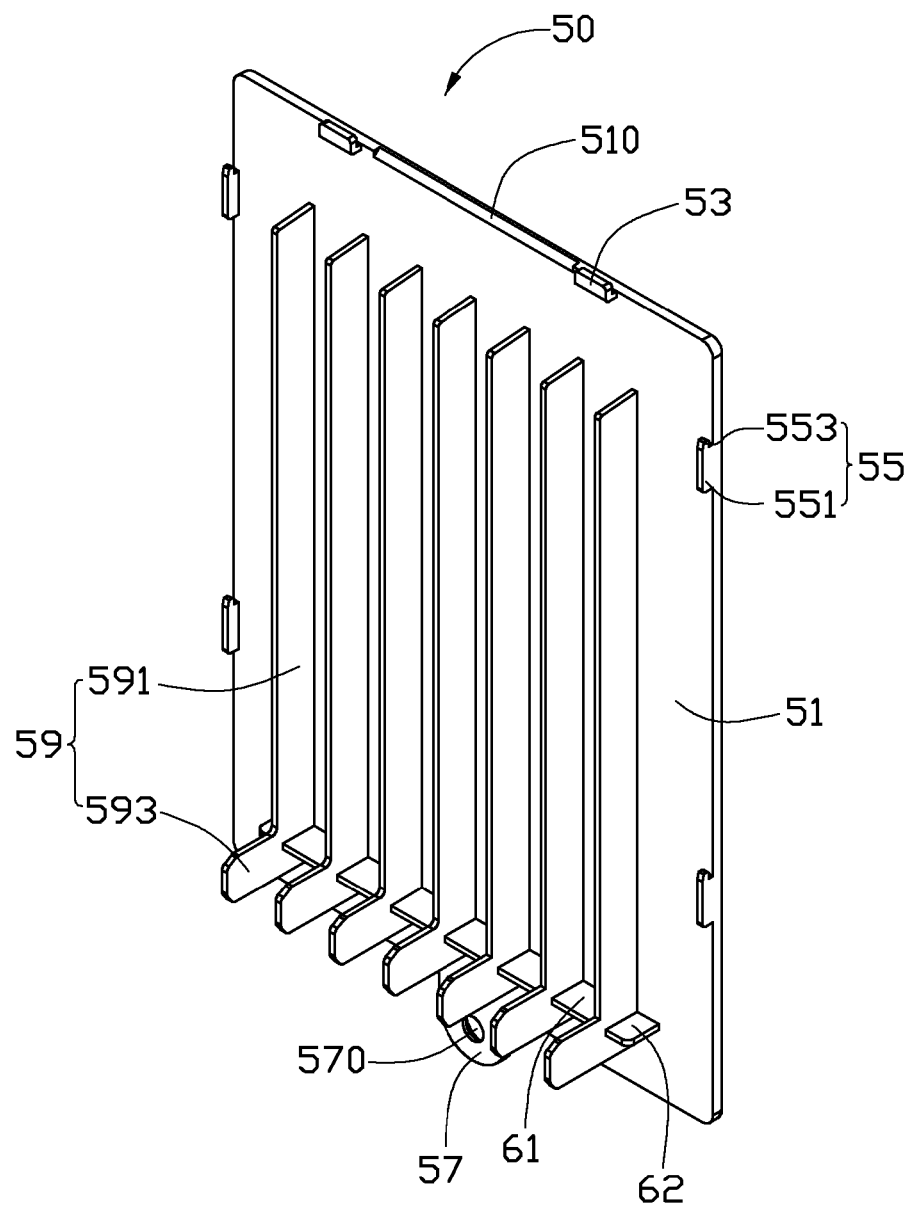
FIG. 3 is an isometric view of the cover in FIG. 2, but viewed from another perspective.

Referring to FIG. 3, the cover 50 is made of plastic. The cover 50 includes a rectangular board 51. Two spaced first hooks 53 extend from a top end of the board 51. Each first hook 53 is L-shaped, and extends horizontally inward from the top end of the board 51 then is bent upward. A first depression 510 is defined in the top end of the board 51 between the first hooks 53. A mounting piece 57 extends downward from a bottom end of the board 51. A through hole 570 is defined in the mounting piece 57. Two spaced second hooks 55 extend inward from each of left and right sides of the board 51. Each second hook 55 includes a main portion 551 extending perpendicularly from the board 51, and a clipping portion 553 extending upward from the main portion 551. A plurality of horizontally spaced, L-shaped holding pieces 59 extends perpendicularly from an inner surface of the board 51. Each holding piece 59 includes a longitudinal leg 591, and a foot 593 connected perpendicularly to a low end of the leg 591. A plurality of first reinforcement pieces 61 extends perpendicularly from the inner surface of the board 51, coupled perpendicularly between every two adjacent feet 593. Two second reinforcement pieces 62 extend perpendicularly from the inner surface of the board 51, each coupled perpendicularly to an outermost foot 593.

Figure 4:
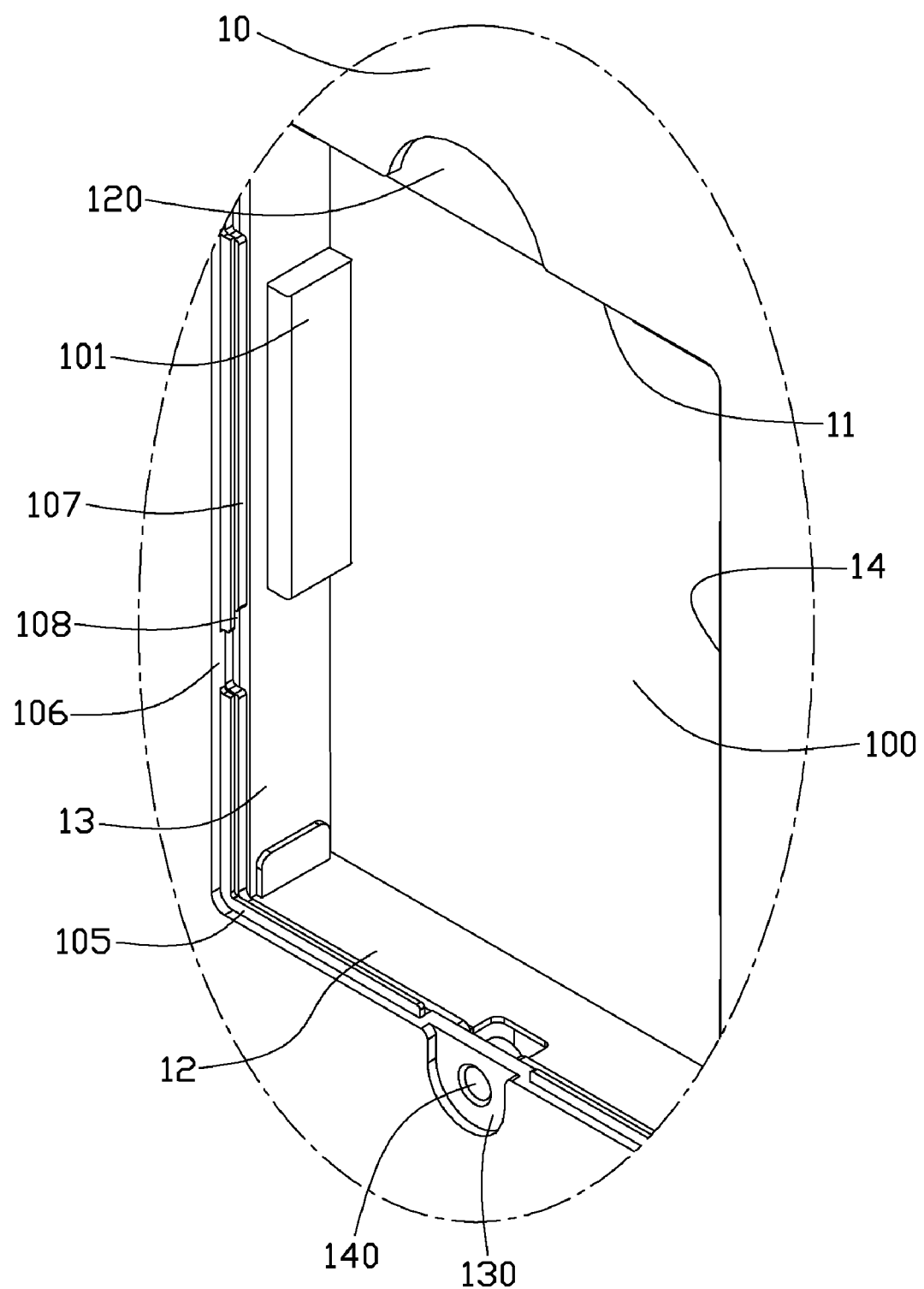
FIG. 4 is an enlarged view of the circled portion IV in FIG. 2.
Figure 5:
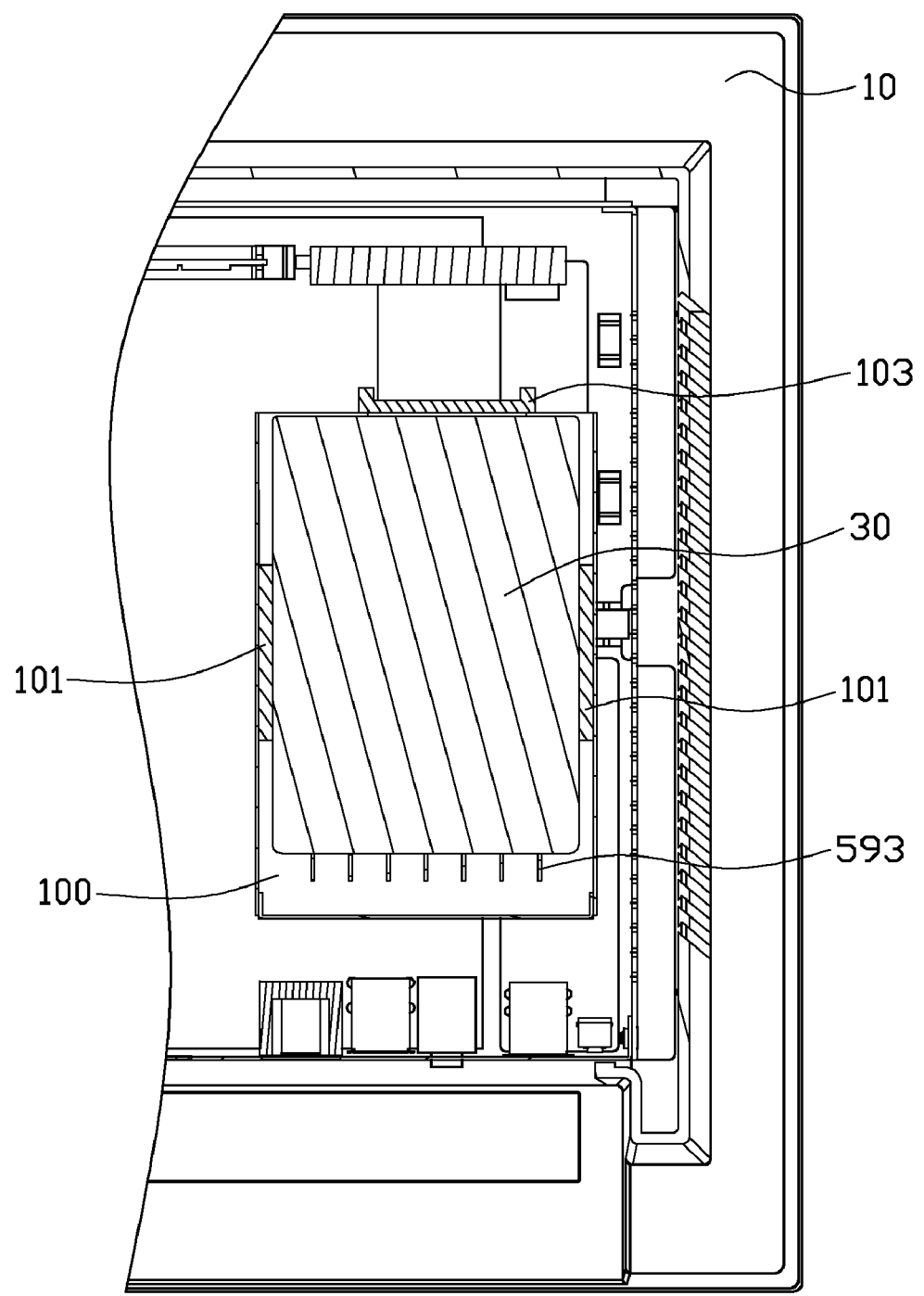
FIG. 5 is a sectional view of the all-in-one computer in FIG. 1, taken along the line V-V, showing the computer partially cutaway.

Referring to FIG. 4, the main body 10 defines a receiving space 100 for receiving the HDD 30. The receiving space 100 is cooperatively bounded by a top wall 11, a bottom wall 12, a left wall 13, and a right wall 14. An annular first raised edge 105 protrudes from the top, bottom, left, and right walls 11, 12, 13, and 14. The first raised edge 105 defines four first slots 106, two of which are located in the left wall 13 and the other two of which are located in the right wall 14. Height of each first slot 106 is substantially equal to height of the main portion 551 of each second hook 55 of the cover 50. A second raised edge 107 protrudes from each of the left and right walls 13 and 14, adjacent to and inside the first raised edge 105. Each second raised edge 107 defines two second slots 108 corresponding to the first slots 106 of the first raised edge 105. Height of each second slot 108 is larger than that of the corresponding first slot 106. The height of each second slot is substantially equal to total height of each second hook 55 of the cover 50. A shock absorber 101 is attached to each of the left and right walls 13 and 14, inside the corresponding second raised edge 107. In one embodiment, the shock absorbers 101 may be foam pieces. In other embodiments, the shock absorbers 101 may be springs or rubber pads. A female connector 103 (see FIG. 5) is attached to the top wall 11 corresponding to the male connector 31 of the HDD 30. A second depression 120, communicating with the receiving space 100, is defined in the main body 10, over the receiving space 100. A shallow mounting groove 130 is defined in the main body 10, under the receiving space 100, corresponding to the mounting piece 57 of the cover 50, and communicates with the receiving space 100. A fasten hole 140 is defined in an inner wall of the mounting groove 130.

Referring to FIGS. 1 to 5, in mounting the HDD 30, the HDD 30 is received in the receiving space 100 of the main body 10 and sandwiched between the shock absorbers 101. The male connector 31 of the HDD 30 is plugged into the female connector 103 of the main body 10. The cover 50 covers the HDD 30. The first hooks 53 of the cover 50 snappingly hook the first raised edge 105. The second hooks 55 of the cover 50 are snapped into the corresponding first and second slots 106 and 108, wherein the clipping portions 553 of the second hooks 55 are received in the corresponding second slots 108 and hook the first raised edge 105. The board 51 of the cover 50 is stopped by the first raised edge 105. In this situation, the HDD 30 is supported on the feet 593 of the holding pieces 59 and abut against the legs 591 of the holding pieces 59 of the cover 50, the mounting piece 57 of the cover 50 is accommodated in the mounting groove 130 of the main body 10, and the through hole 570 of the mounting piece 57 aligns with the fasten hole 140 of the main body 10. The fasten member 70 is extended through the through hole 570 of the cover 50 and engaged in the fasten hole 140 of the main body 10. Therefore, the HDD 30 is securely installed.

It is noted that the holding pieces 59 of the cover 50 are disposed not only for holding the HDD 30, but also for dissipating heat from the HDD 30. In detail, a channel formed between every two adjacent holding pieces 59 allows air to flow in the channel, in order to promote heat dissipation for corresponding side and end of the HDD 30.

In disassembly, the fasten member 70 is detached, and a finger is inserted into the first depression 510 of the cover 50 and the second depression 120 of the main body 10, pulling the cover 50 away from the main body 10. Therefore, the HDD 30 is ready to be removed from the main body 10.

In other embodiments, the shock absorbers 101 or additional shock absorbers may be attached to other places of in the receiving space 100 of the main body 10, for absorbing shock for the HDD 30.

In other embodiments, the second raised edges 107 of the main body 10 may be omitted. In this situation, the second hooks 55 of the cover 50 can still hook the first raised edge 105.

In other embodiments, the first hooks 53 or the second hooks 55 may be omitted. In this situation, the remained hooks 55 or 53 can still attach the cover 50 to the main body 10. Furthermore, one of the first hooks 53 or one of the second hooks 55 may be omitted.

It is to be understood, however, that even though numerous characteristics and advantages of the disclosure have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An all-in-one computer comprising:
   a hard disk drive (HDD);
   a main body defining a receiving space to receive the HDD, and a fasten hole, wherein the receiving space is bounded by a plurality of walls, and a first raised edge protrudes from the plurality of walls in the receiving space;
   a cover comprising a board, a first hook, and a mounting piece defining a through hole, wherein the board comprising opposite first and second ends, the first hook extends from the first end, and the mounting piece extends from the second end; and
   a fasten member;
   wherein when the cover is mounted to the main body, the first hook snappingly hooks an inner side of the first raised edge, the board is stopped by the first raised edge, and the fasten member is able to extend through the through hole and engage in the fasten hole.

2. The all-in-one computer of claim 1, wherein the first hook is L-shaped, and extends perpendicularly inward from the board then bent away from the second end of the board.

3. The all-in-one computer of claim 1, wherein the board of the cover comprises opposite third and fourth ends, a second hook extends from each of the third and fourth ends, when the cover is mounted to the main body, the second hooks snappingly hook the inner side of the first raised edge.

4. The all-in-one computer of claim 3, wherein the first raised edge defines two first slots corresponding to the second hooks, the second hooks are able to extend through the corresponding first slots to hook the inner side of the first raised edge.

5. The all-in-one computer of claim 4, wherein each second hook comprises a main portion extending perpendicularly from the board and having a height matching the corresponding first slot, and a clipping portion extending from the main portion towards the first end of the board to hook the first raised edge.

6. The all-in-one computer of claim 5, wherein two second raised edges protrude from the plurality of walls in the receiving space corresponding to the second hooks of the cover, the second raised edges are adjacent to the inner side of the first raised edge, each second raised edge defines a second slot matching total height of the corresponding second hook, when the cover is mounted to the main body, the second hooks are snapped into the corresponding first and second slots.

7. The all-in-one computer of claim 1, wherein a mounting groove is defined in the main body to accommodate the mounting piece of the cover.

8. The all-in-one computer of claim 1, wherein a first depression is defined in the first end of the board of the cover, a second depression is defined in the main body corresponding to the first depression and communicates with the receiving space, when the cover is mounted to the main body, the first and second depression cooperatively facilitate removing the cover from the main body.

9. The all-in-one computer of claim 1, wherein two shock absorbers are oppositely attached to the plurality of walls.

10. The all-in-one computer of claim 9, wherein the absorbers are foam pieces, springs, or rubber pads.

11. The all-in-one computer of claim 1, wherein a plurality of horizontally spaced holding pieces extends perpendicularly from an inner surface of the board of the cover, each holding piece comprises a longitudinal leg to abut the HDD, and a foot connected perpendicularly to a low end of the leg to support the HDD.

12. The all-in-one computer of claim 11, wherein a plurality of reinforcement pieces extends from the inner surface of the board and is coupled with the feet of the holding pieces.

13. The all-in-one computer of claim 11, wherein the fasten member is a screw.

14. An all-in-one computer comprising:
    a hard disk drive (HDD);
    a main body defining a receiving space to receive the HDD, and a fasten hole, wherein the receiving space is bounded by a plurality of walls, and a first raised edge protrudes from the plurality of walls in the receiving space;
    a cover comprising a board, two first hooks, and a mounting piece defining a through hole, wherein the board comprises opposite first and second ends, and opposite third and fourth ends, the first hooks extend from the third and fourth ends respectively, and the mounting piece extends from the second end; and
    a fasten member;
    wherein when the cover is mounted to the main body, the first hooks snappingly hook an inner side of the first raised edge, the board is stopped by the first raised edge, and the fasten member is able to extend through the through hole and engage in the fasten hole.

15. The all-in-one computer of claim 14, wherein a second hook extends from the first end of the board of the cover, when the cover is mounted to the main body, the second hook snappingly hooks the inner side of the first raised edge.

16. The all-in-one computer of claim 14, wherein a mounting groove is defined in the main body to accommodate the mounting piece of the cover.

17. The all-in-one computer of claim 14, wherein a first depression is defined in the first end of the board of the cover, a second depression is defined in the main body corresponding to the first depression and communicates with the receiving space, when the cover is mounted to the main body, the first and second depression cooperatively facilitate removing the cover from the main body.

18. The all-in-one computer of claim 14, wherein two shock absorbers are oppositely attached to the plurality walls.

19. The all-in-one computer of claim 18, wherein the absorbers are foam pieces, springs, or rubber pads.

20. The all-in-one computer of claim 14, wherein a plurality of horizontally spaced holding pieces extends perpendicularly from an inner surface of the board of the cover, each holding piece comprises a longitudinal leg to abut the HDD, and a foot connected perpendicularly to a low end of the leg to support the HDD.

* * * * *